INVENTORS
EDWARD B. WILFORD
ELLIOT DALAND
BY Frank H. Borden
ATTORNEY.

Jan. 19, 1937.  E. B. WILFORD ET AL  2,068,617
GYROPLANE
Filed Feb. 7, 1934   4 Sheets-Sheet 4

INVENTORS.
EDWARD B. WILFORD
ELLIOT DALAND
BY
Frank H Borden
ATTORNEY.

Patented Jan. 19, 1937

2,068,617

UNITED STATES PATENT OFFICE 2,068,617

GYROPLANE

Edward Burke Wilford, Merion, and Elliot Daland, Philadelphia, Pa.; said Daland assignor to said Wilford Application February 7, 1934, Serial No. 710,062

7 Claims. (Cl. 244—18)

This invention relates to gyroplanes.

As gyroplanes of the rigid rotor type, wherein the blades "feather" to change the effective lift of the blades, have developed heretofore, the rotors or rotary wing systems have been possessed of an even number of blades, arranged in pairs and usually on shafts common to both blades of a pair, so that the axes of oscillation of the blades of a pair have been substantially coincidental. This structure has been most capable of absorbing centrifugal forces and bending moments but aerodynamically has not reached the heights of efficiency of which the gyroplane is theoretically capable. In the application of E. Burke Wilford, Ser. No. 478,990, filed August 30, 1930, there is disclosed the same even number of blades in the rotary wing system but each blade is upon its own individual shaft, and with the axes of the shaft angularly divergent although lying in part substantially in a common vertical plane as a function of dihedral in the rotor. In this case substantially diametrically opposite blades were coupled through driving connections so as to function in coupled pairs. It has been recognized that aerodynamically a rotor with an odd number of feathering blades would theoretically be efficient as well as simpler and cheaper than with the conventional even number of blades, but it has not previously been considered possible to design a three bladed feathering rotor, for instance, in which the bending and centrifugal forces in the rotor could be properly taken care of so as to make a strong and safe structure. To accomplish this result and to individually feather each blade, regardless of the number of blades, constitutes a major object of the invention. This enables feathering individually or singly each blade regardless of number.

In the application of E. Burke Wilford, Ser. No. 680,695, filed July 17, 1933, there was a disclosure of the provision of the combination of rotor control means and fixed control means with connections for operating both simultaneously. This application also disclosed means coupling two independent blade carrying shafts so that non-diametrically opposed blades were coupled to synchronous oscillatable or feathering relation. In a companion application with the same filing date, Ser. No. 680,694, there was a disclosure made of means for disposing the major load of the aircraft upon either the rotor or the fixed wing systems. It is an important object of this invention to improve upon the inventions of all of the recited applications above noted.

It is among the further objects of this invention; to provide a gyroplane with an uneven number of blades; to provide a gyroplane with an uneven number of blades with control devices such as to secure rotor control; to provide a gyroplane with an odd number of blades arranged for "feathering" with driving means coupling the blades for synchronous feathering; to provide in a gyroplane with an odd number of blades, means for balancing or, selectively, unbalancing, the lift on opposite sides of the center or axis of rotation; to improve the gyroplanes shown in the cited copending applications; to provide a gyroplane structure which takes care of both bending and centrifugal forces with an odd number of blades; to provide an improved gyroplane arranged for easy and ready storage through partial folding of the rotor; to provide in a gyroplane means for adjusting the attitude of the fixed wing in flight; to provide in gyroplanes a rotor control and fixed controls, with an irreversible connection to the manual control device such that torque in the rotor control is ineffective on the manual device, but wherein the balancing of the fixed controls is effective on the manual device to balance same; to "fair" blade supporting shafts to improve aerodynamic efficiency of the whole; and to improve generally the art of gyroplanes; and many other objects and advantages will become more apparent as the description proceeds.

In the accompanying drawings forming part of this description.

Figures 3, 3A, 3B, 4, 5:
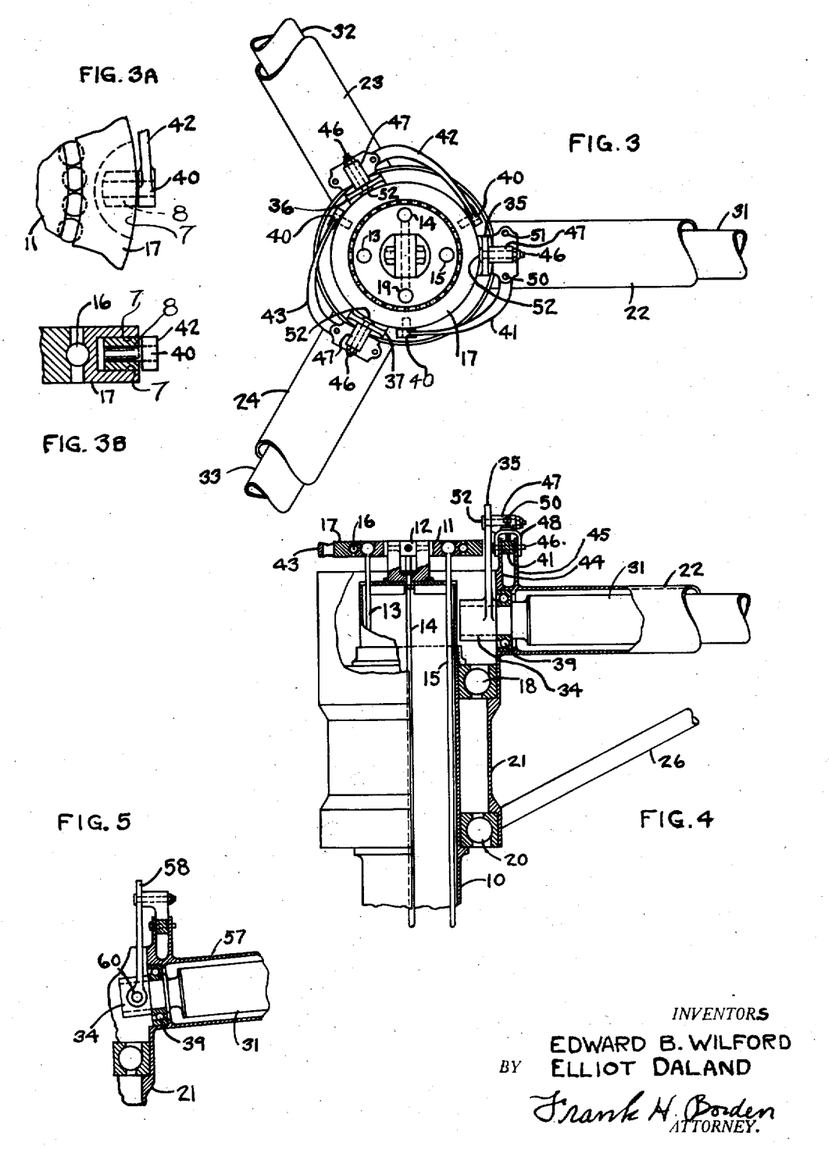
Fig. 3 represents a fragmentary enlarged plan of the coupling devices forming the driving connections for the respective blades.
Figs. 3A and 3B represent, respectively, a fragmentary plan and a section of the mounting of control pins of the driving connections of Fig. 3.
Fig. 4 represents a fragmentary elevation partially in section of the assembled device of Fig. 3.
Fig. 5 represents a fragmentary elevation partially in section through a modified form of gyroplane hub, in which the blades have dihedral.

Referring to Fig. 4, it will be observed that a stationary mast 10, carries the coaxial universally mounted stationary but adjustable race or ring 11, through a sort of gimbal suspension 12, and which is controlled in angular attitude by means of the respective links 13, 14, 15 and 19 as will be clear. The adjustable race or ring 11, is a bearing for balls 16 upon which the rotatable race-way or ring 17 is disposed for free rotation. Below the upper end of the stationary mast 10, there are provided suitable bearings, preferably thrust bearings, such as shown at 18 and 20 upon which the rotatable housing or hub 21 is disposed. Preferably the hub has clearance from the mast to house the control elements to be described.

The housing or hub 21 is provided with a plurality of radially extending tubular arms, such as 22, 23 and 24, in number the same as the number of blades, to be described. In the illustrative form shown in Figs. 1 to 4 inclusive, there are three such radial housings. It will be understood that the radial housings will be suitably braced in the assembly, as by struts 25, between the adjacent housings, and by inclined vertically disposed struts 26 connected the respective radial housings with the hub 21.

Still referring to the disclosure of Figs. 1 to 4 inclusive there are provided blades or wings 27, 28 and 30, each of which is rigidly mounted upon a supporting shaft respectively 31, 32 and 33, each of which respectively is journalled in its appropriate radial housing in bearings 29 so as to be oscillatable therein. It is preferred but not necessary that the axis of the respective shafts 31, 32 and 33 be so disposed relative to the blades or wings that the center of pressure of such blades is rearwardly of its respective axis. It is preferred to continue the blade shafts inwardly past the line of the hub or housing 21 in the clearance space between that rotatable element and the stationary mast 10, as shown in Fig. 4 in dotted lines at 34, and which extension is journalled in a thrust bearing 39. Each shaft extension has keyed or splined to it a substantially vertical lever arm. The respective lever arms are numbered 35, 36 and 37. It will be clear that oscillation of the respective arms and of their attached shafts will cause oscillation of the attached blades or wings relative to bearings 39 and 29.

The outer rotatable race or ring 17 is provided, in the three bladed form shown in Fig. 3, with three evenly spaced radial arcuate openings in which radial pins 40 are respectively disposed. As shown in Figs. 3A and 3B, pin 40 is rotatable in a slidable journal 8 movable in any desired direction between spaced cheeks 7, to prevent binding. Each radial pin being preferably disposed at substantially 90° from the radial wing carrying shaft which it is designed to control, as will be observed in Fig. 3. A substantially tangentially extending curved arm, of a plurality, respectively 41, 42 and 43, is pivotally connected to the respective radial pins 40. The outer ends of the respective curved arms are guided between fixed spaced surfaces of walls 44 and 45 integral with the adjacent respective radial housings and are held by pivot pins 46 extending therethrough and upon which the lever arms can oscillate. A substantially vertical extension 47 is mounted upon a yoke 48 which is pivotally mounted upon the pin 46 and the angular relation of which to the appropriate lever arm being variable by means of adjustable set screws 50 and 51 bearing against the lever arms on opposite sides of the pivot pin 46. A pivot pin 52 engages extension 47 with the substantially vertical upstanding wing spar carried lever 35, etc., by a suitable slot (not shown), in such lever arm. The adjustment is such that slight inequalities in manufacture or rigging can be compensated for, and the lost motion connection is to account for the eccentricity of the axes of the respective coupled levers relative to their coupling, as will be clear.

Figure 1:
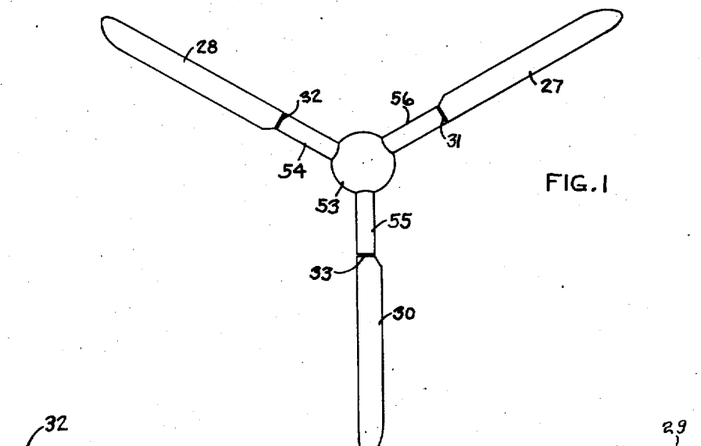
Fig. 1 represents a plan of an illustrative form of gyroplane with three blades.
Figures 2, 2A:
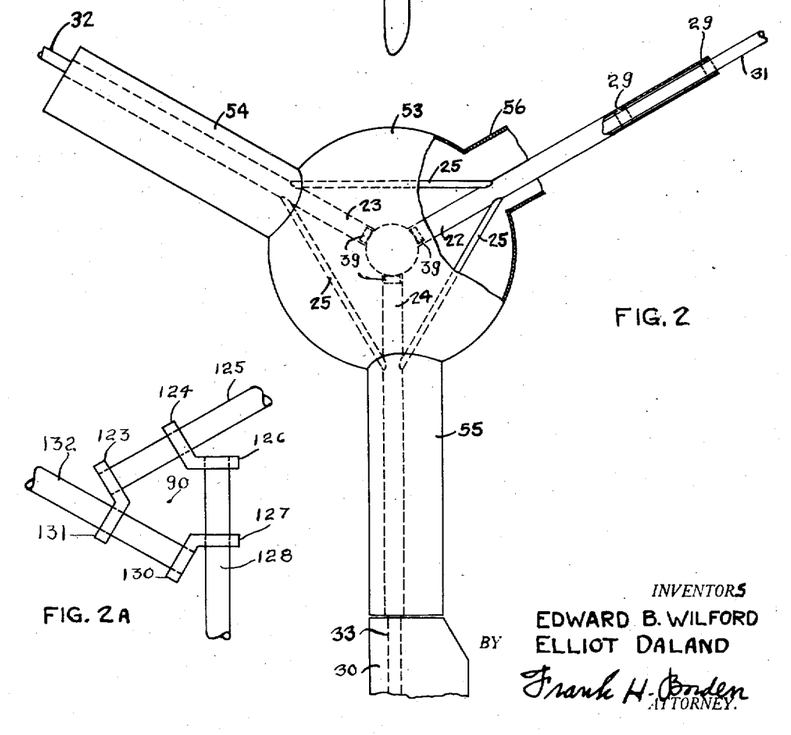
Fig. 2 represents a fragmentary enlarged plan of the same partially in section and with parts removed.
Fig. 2A represents a fragmentary plan of a hub and shafts of another form of three bladed rotor.

It is preferred that the entire assembly just described be faired and housed in a stream-lined housing 53, and that the radially projecting housings 22, 23, and 24, may also be faired or streamlined by a suitable radial stream-lined extension such as is shown at 54, 55 and 56. This latter fairing need not be provided if the blades or wings extend inwardly close to the hub, but as the rotative speed close to the hub is slow, adequate control and variation, as well as equalization, of effective lift can be secured by having the wing tips the oscillatable control surfaces. For that reason the structure disclosed in Figs. 1 and 2 is deemed of importance.

It should be noted that the existence of a dihedral angle in the rotor need make no difference in the control which may be substantially as already disclosed with slight changes as will be pointed out. Referring to Fig. 5 it will be observed that the radial housing 57 has a slight upward inclination relative to the horizontal and relative to the hub 21. The spar 31 journalled therein will also be similarly inclined, and the upstanding control lever 58, analogous to 35 in Fig. 4 will be coupled to the inwardly extending end 34 of shaft 31 by a transverse pivot pin 60 instead of with the rigid connection of the other figures, and all other features will be the same as already described, including the thrust bearing 39, and it is believed its operation will be clear.

Figure 6:
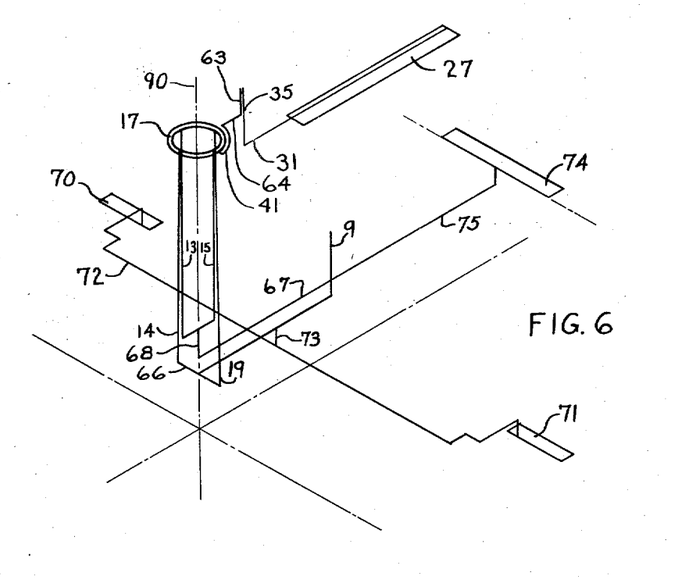
Fig. 6 represents a diagrammatic and fragmentary perspective of a complete rotor control system according to this invention in which the irreversible connections to the manual control device are actuated by the fixed control surfaces to balance the control system.

It will be understood that with all of the devices as disclosed heretofore, and as modified to suit any particular desires, such as by increasing or decreasing the number of blades and making the number odd or even, that there is a driving connection between blades which latter are not diametrically opposite, and there is a cycle of oscillation of the blades in synchronism during rotation of the system. It will be clear that manipulations of the control links 13, 14, 15 and 19 by any desired control mechanism, such as is shown in Fig. 6 will tilt the inner fixed race member 11 so as to change the angular disposition of the outer rotatable member so that during the rotation of the wing system on its hub relative to the mast 10 there will be predetermined synchronized cyclic oscillations of all of the blades.

While each of the oscillating devices of Fig. 1 to 5 are of value in securing predetermined angular positions of the respective blades during rotation, it will be clear that aerodynamic torque if developed by the respective blades, incident upon the respective shafts 31, 32 and 33 will also be manifested by thrust on arms 41, 42 and 43 such as to tend to urge the control stick 9 toward such angular position as would reduce the torques on the blade carrying shafts to a minimum. In other words, the operator probably would always be aware of a tendency to urge the control stick 9 back toward a substantially neutral position. This would certainly be true when the center of pressure is eccentric to the feathering axis. While this is usually desired in order that he may know the position of his control devices, it may from time to time introduce vibrations and flutter of various sorts into the control stick 9 to a degree that would be undesirable. To prevent this undesirable factor from arising the alternative form of invention shown in Figs. 6, 7 and 8 may be utilized. Briefly stated this modification provides an irreversible control between the control stick and the oscillatable or feathering blade such that the control stick 9 instantaneously controls the feathering blade position but the torque on the feathering blade is impotent to affect the control stick. This control system is coupled with fixed blade controls in such a manner that the latter smoothly applies centering controlling urge upon the control stick and therefore upon the feathering blades without vibration, etc.

Figure 7:
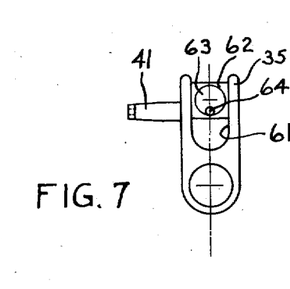
Figs. 7 and 8 represent fragmentary end and sectional views of an illustrated form of lost motion connection for the control system.
Figure 8:
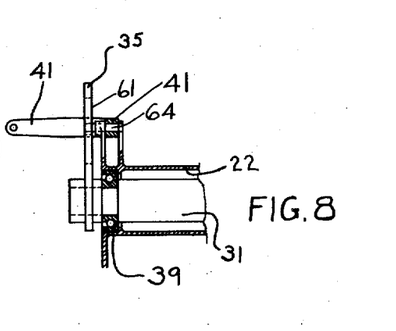

Referring to Figs. 7 and 8 the shaft 31 carries the upstanding arm 35 as before, on the inner side of the thrust bearing 39 and the arm 35 in the form of a yoke has an enlarged vertical opening 61 in which a block 62 is slidably journalled having the rotatable eccentric 63 journalled in the block 62. The pivoted control arm 41, journalled as before in the fixed extension of the housing 22 is mounted to oscillate with a keyed or splined pin 64, carrying the eccentric 63 upon its outer end. It will be clear that swinging of arm 41 upon pivot 64 will rotate the pivot 64 and eccentric 63. Rotation of the latter will cause block 62 to swing laterally turning arm 35 and shaft 31. It will be clear that torque on shaft 31 will be opposed by such friction as to be substantially incapable of having any adjusting action on arm 41. For purposes of clarity but a single blade 27 and its control mechanism has been disclosed, but the parts in Fig. 6 are such as have already been disclosed. It will be clear that the controlling functions imposed or impressed upon this rotary wing system including blade 27, by the irreversible control described, will be controlled by stick 9, or its equivalent, through the rock shaft 65 and transverse lever arm 66 attached to the lateral control links 14 and 19, while the longitudinal control will be through longitudinally movable link 67, connected pivotally to the T lever 68, the fore and aft extremities of which connect with the links 13 and 15. It will be clear that although vibratory and torque impulses will not travel back from the rotor to the stick 9, due to the irreversible control noted, it will also be true that there will be no, or substantially no, centering impulse on the stick 9 urging it and the rotor control to neutral after a controlling action, from the rotor itself.

To secure this desirable effect, but without any danger of vibratory impulses being imparted, fixed wing ailerons 70 and 71 connecting through suitable linkages 72, engage depending horn 73 of rock shaft 65. Similarly elevator 74, connects through linkage 75 with stick 9. Movement of stick 9 to a position of eccentricity, either in the fore and aft, lateral, or combined, direction, actuates the rotor control so as to change the angles through which the respective shafts oscillate during rotation of the system. Of course the respective aileron and elevator control surfaces will simultaneously be actuated. The smooth and even pressure exerted back from the fixed control surfaces, being directly operative on stick 9 urging it smoothly and without vibration back toward neutral position, as the fixed control surfaces are urged toward neutral.

Figures 9, 10, 11, 12, 13, 14, 15, 16, 17, 18:
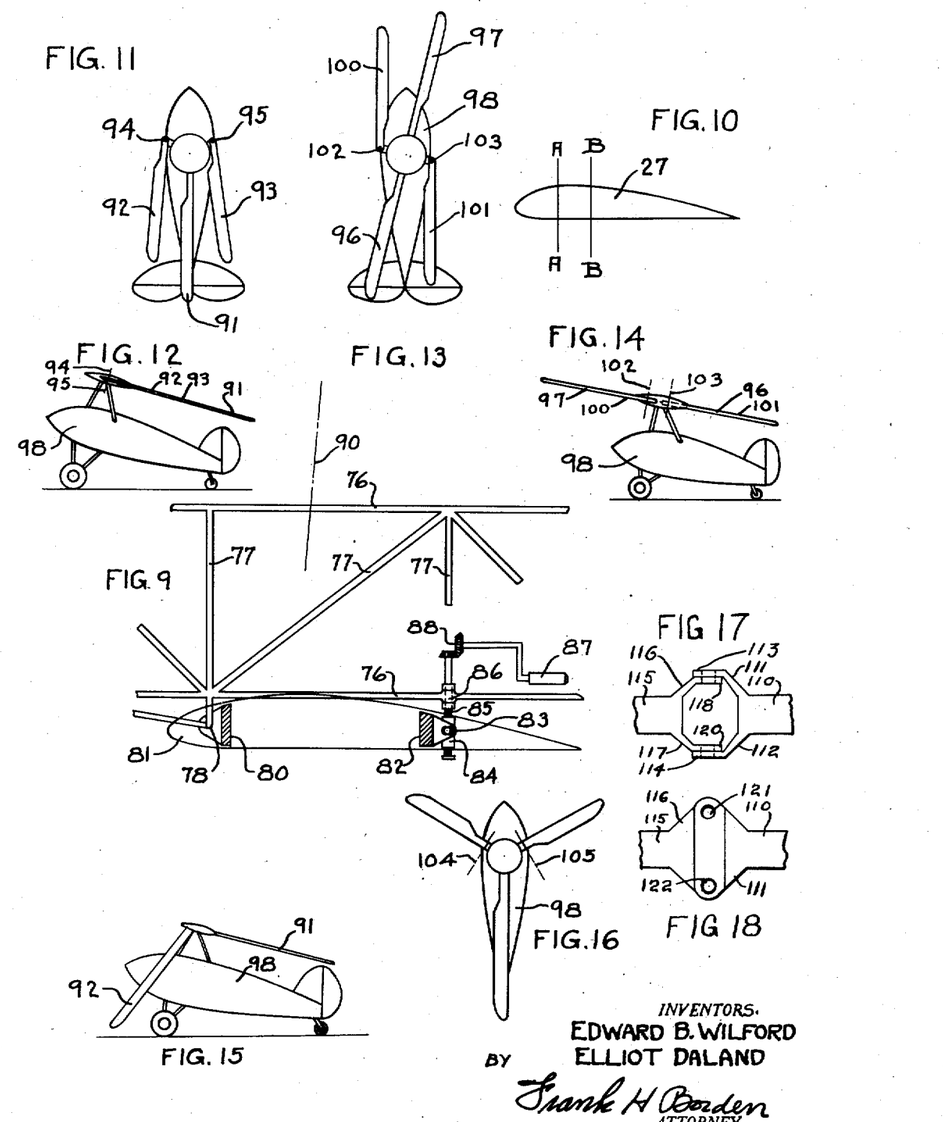
Fig. 9 represents a fragmentary elevation partially in section through an adjustable wing of a gyroplane with an adjusting mechanism according to a form of the invention.
Fig. 10 represents a diagrammatic end elevation of a gyroplane rotor blade showing that the approximate vertical lines of the center of gravity and of the axis of oscillation are practically coincident, while the vertical line of the average center of pressure is offset therefrom.
Figs. 11 and 12 represent a plan and side elevation of a form of folding rotor according to one phase of the invention.
Figs. 13 and 14 represent a plan and side elevation of a modified form of folding rotor according to one phase of the invention.
Figs. 15 and 16 represent a plan and side elevation of another modified form of folding rotor according to one phase of the invention.
Figs. 17 and 18 represent a fragmentary plan and elevation of a coupling pivoting device enabling both rigid support and folding of rotor blades.

In the previously mentioned application Ser. No. 680,694, there was a disclosure of a rotary and fixed wing system arranged alternatively to support the major load. It was a feature of the invention that the fixed wing system was arranged for variation in its angular relation to the rotary wing system. In Fig. 9 herein, there is a modification disclosed applicable, among other situations, to the copending application. The structural elements of the aircraft include frame members comprising longerons 76 and bracing 77. To the bracing there is pivotally attached, as at 78, the front spar 80 of a relatively fixed wing 81. A rear spar 82 has a lost motion or sliding connection with a pin 83 carried upon a traveling nut 84 mounted on thread of shaft 85 journalled in the frame at 86, and rotated by crank or the like 87, through gearing 88.

The rotary wing system is not shown in the drawing, but its relative disposition is shown by the axis line 90, to indicate the relationship of rotor axis to fixed wing 81. Obviously the relation of the rotary wing system indicated by axis 90 and of the fixed wing 81 may be changed by manipulations of crank 87 both on the ground and in flight.

In order to reduce vibrations, and the forces of inertia in the blades of the rotary wing systems, it is preferred that the center of gravity of the feathering blade be located close to the feathering axis and that the average center of pressure effective upon the blade be disposed appreciably spaced from the axis. Specifically referring to Fig. 10, the blade 27 preferably has a feathering axis disposed in the vertical plane indicated by line $a-a$ and preferably also the center of gravity of the wing or blade 27 will be located in the same plane. To this end it will be so proportioned and formed that its average center of pressure may lie substantially in a plane indicated by the line $b-b$. Obviously in this illustrative form the feathering torque is manifested by a lever arm $a-b$ but that the inertia resisting operation of the lever arm is reduced to a minimum by making the feathering axis and center of gravity substantially coincidental. In any case it will be preferred that if the center of gravity be eccentric to the feathering axis that it will be disposed closer to the said axis than is the center of pressure.

The problem of storage of gyroplanes of the rigid feathering type to which this invention relates, is one to which considerable attention has been paid. In the forms of gyroplanes disclosed in Figs. 11, 13 and 15 several alternative forms of storable gyroplanes are disclosed. Referring to Figs. 11 and 12, there is disclosed a three bladed rotor, the feathering axes of which lie substantially in a common plane substantially perpendicular to the axis of rotation. One blade 91 has its rigid journalled relation to the hub, as has already been described, but blades 92 and 93 are connected by substantially vertical hinges 94 and 95, to the hub, with hinge pins substantially parallel to the perpendicular axis of rotation of the hub so that the blades 92 and 93 may be swung from their normal angular relation of 120° to a position of substantial parallelism while within the lateral confines of the remainder of the gyroplane as shown in Figs. 11 and 12.

In Figs. 13 and 14 a four bladed rotor is disclosed having blades 96 and 97 coupled on a common driving shaft and arranged to remain in the plane of rotation but for storage to be disposed substantially parallel to the longitudinal axis of the fuselage 98. The other pair of wings or blades 100 and 101 are disposed upon respective vertical hinges 102 and 103 arranged to be swung in the same direction in parallelism with the respective fixed blades 97 and 96 as shown in Fig. 13.

In the three bladed disclosure of Figs. 15 and 16 one blade 91 is arranged as in Fig. 11 to remain with its axis in the plane of rotation while blades 92 and 93 are coupled to the hub upon substantially horizontal tangential hinges so that the blades may swing downwardly from the hub toward the ground on each side of the nose of fuselage 98 as shown in Fig. 15. The blades 92 and 93 in this modification are coupled to the hub by means of substantially horizontal hinges 104 and 105.

In all of the forms of folding blades disclosed it will be understood that suitable strengthening and reinforcing safety devices will be used to insure the rigidity of the hinges during the normal rotation of the rotor and its use as a sustaining element.

Referring to Figs. 17 and 18 there is shown a form of dismountable connection that has utility in connection with folding the rotor blades in all three of the modified forms shown herein, and specifically in the disclosure of each of Figs. 11, 12, 13, 14, 15 and 16, depending for its utility upon the particular relative angularity of its parallel flat faces, to be described, to the horizontal or vertical.

The center section shaft or spar of any of the forms disclosed, as 110, terminates in a yoke comprising spaced flanges and legs or webs 111 and 112, having the parallel flat plate faces respectively 113 and 114. The spar or shaft of the wing carrying portion of the supporting structure, 115, has similar divergent yoke legs, webs or flanges 116 and 117, respectively, terminating in parallel spaced flattened plates or faces 118 and 120, of similar spacing. The arrangement is such that a close sliding fit and relative seating is secured upon the operative association of the spar or shaft portions so as to bring respective plate elements into juxtaposition. Removable lock and pivot pins 121 and 122 are arranged to lock juxtaposed legs of the yoke together on opposite sides of a median perpendicular plane containing the axis of the coupled shafts. It will be clear that removal of either pin 121 or 122 will permit angular adjustment of the spar or wing shaft 115 relative to the fixed shaft 110 on the other remaining pin as a pivot. Also both pins may be removed in order to disconnect the blades, as when blades of different characteristics are to be mounted or for storage purposes. The angularity of the parts relative to the horizontal determines the plane in which the relative angular adjustment occurs so as to secure storing disposition of the rotor in accordance with the modifications already shown. This is believed to be clear.

In the modification shown in Fig. 2A the three bladed rotor has an illustrative diagrammatic form of a hub having a plurality of blades in which with relation to an axis of rotation of the hub 90 the rotary system may rotate. The hub has spaced bearings substantially tangential to the axis 90 so that a pair of bearings 123 and 124 journal a shaft 125 for feathering or oscillation, while the bearings 126, 127 journal a shaft 128 for feathering or oscillation and bearings 130, 131 journal or support for feather oscillation a shaft 132. By making the hub large enough to space the bearings a distance sufficient to carry the load and the imposed forces a desirable form of mounting of the shafts for the blades is secured. It will be understood that blades (not shown) will be mounted on the ends of shafts 125, 128 and 132.

It is believed that the numerous advantages presented by the invention will be obvious as will the fact that modifications of various features may be made without departing from the spirit and scope of the invention, and all such are to be construed as forming part of this invention unless otherwise specifically limited in the following claims.

We claim:

1. In a rotary wing system, a hub, shafts journalled in the hub, normally aerodynamically driven blades mounted on the shafts, fairing larger than the hub covering the inner and less important parts of the rotary wing system so that the unimportant part of the lift derived from slowly rotating parts is not equalized, feathering blades extending beyond the fairing and arranged normally to be aerodynamically rotated, means synchronously coupling the feathering blades so that the outer and more important parts of the rotary wing system has substantially equalized lift.

2. In gyroplanes, a normally aerodynamically driven rotary cantilever feathering wing system a control system operated by the pilot, comprising a rotor control system, a fixed wing control system for elevator and ailerons, means in the rotor control system for feathering each blade in the control system individually during different positions of rotation, the systems so arranged that the elevator control occurs when the maximum angle of blade occurs near the fore and aft position of said blade and the aileron control occurs when the maximum angle of the blade is near the lateral position of the blade during rotation.

3. In aircraft whose lifting surface comprises a normally aerodynamically driven rotary wing system and a fixed wing system, means for changing the angular relation between the two systems, control systems operative on both the fixed and rotary wing systems, and a manual device for operating both control systems.

4. In rotary wing aircraft, a hub having a rotating portion, a plurality of blades journalled in the rotating portion of the hub, a ring universally mounted on the fixed portion of the hub and comprising an inner stationary member and an outer rotatable member journalled on the inner member, a plurality of curved arms, each of which is journaled at one end on a radial axis which passes through the universal center of the ring on the rotating portion of the hub in proximity to the respective blades which they control, means coupling the said arm ends with the said respective journalled blades so that oscillation of an arm causes oscillation of its coupled blades with a predetermined ratio of movement, said arms being curved around the ring and having their other ends journalled on the rotatable member of the ring on a radial axis intersecting the universal center at ninety degrees spacing from the first mentioned axis of the arm.

5. In a rotary wing system, a hub, a control ring universally journalled in the hub and comprising an inner relatively stationary member and an outer rotatable member, a plurality of blades journalled in the hub, a plurality of arms operatively coupled with the respective blades and having axes respectively radial of the hub and intersecting said universal center, means journalling the free ends of the arms on the outer member on radial axes intersecting the universal center and respectively ninety degrees away from the first mentioned pivotal axes of the respective arms.

6. In aircraft, a rotary wing system comprising a hub, more than two blades journalled in the hub, each blade having a pair of spaced bearings and being non-radial, having its axis passing through the hub at a predetermined distance from the axis of rotation, the inner bearing of one blade and the outer bearing of the adjacent blade being directly secured together whereby upward forces of the said outer bearing oppose the downward forces of said inner bearing.

7. In aircraft, a rotary wing system, comprising a hub, more than two blades journalled in the hub, each blade having a pair of spaced bearings and being non-radial, having its axis passing through the hub at a predetermined distance from the axis of rotation, the inner bearing of one blade and the outer bearing of the adjacent blade being secured together and to the hub whereby upward forces of the said outer bearing oppose the downward forces of said inner bearing.

EDWARD BURKE WILFORD.
ELLIOT DALAND.

DISCLAIMER 2,068,617.—*Edward Burke Wilford*, Merion, and *Elliot Daland*, Philadelphia, Pa. GYROPLANE. Patent dated January 19, 1937. Disclaimer filed March 23, 1939, by the patentees.

Hereby enter this disclaimer to claim 3 in said specification.

[*Official Gazette April 18, 1939.*]

prising an inner stationary member and an outer rotatable member journalled on the inner member, a plurality of curved arms, each of which is journaled at one end on a radial axis which passes through the universal center of the ring on the rotating portion of the hub in proximity to the respective blades which they control, means coupling the said arm ends with the said respective journalled blades so that oscillation of an arm causes oscillation of its coupled blades with a predetermined ratio of movement, said arms being curved around the ring and having their other ends journalled on the rotatable member of the ring on a radial axis intersecting the universal center at ninety degrees spacing from the first mentioned axis of the arm.

5. In a rotary wing system, a hub, a control ring universally journalled in the hub and comprising an inner relatively stationary member and an outer rotatable member, a plurality of blades journalled in the hub, a plurality of arms operatively coupled with the respective blades and having axes respectively radial of the hub and intersecting said universal center, means journalling the free ends of the arms on the outer member on radial axes intersecting the universal center and respectively ninety degrees away from the first mentioned pivotal axes of the respective arms.

6. In aircraft, a rotary wing system comprising a hub, more than two blades journalled in the hub, each blade having a pair of spaced bearings and being non-radial, having its axis passing through the hub at a predetermined distance from the axis of rotation, the inner bearing of one blade and the outer bearing of the adjacent blade being directly secured together whereby upward forces of the said outer bearing oppose the downward forces of said inner bearing.

7. In aircraft, a rotary wing system, comprising a hub, more than two blades journalled in the hub, each blade having a pair of spaced bearings and being non-radial, having its axis passing through the hub at a predetermined distance from the axis of rotation, the inner bearing of one blade and the outer bearing of the adjacent blade being secured together and to the hub whereby upward forces of the said outer bearing oppose the downward forces of said inner bearing.

EDWARD BURKE WILFORD.
ELLIOT DALAND.

DISCLAIMER 2,068,617.—*Edward Burke Wilford*, Merion, and *Elliot Daland*, Philadelphia, Pa. GYROPLANE. Patent dated January 19, 1937. Disclaimer filed March 23, 1939, by the patentees.

Hereby enter this disclaimer to claim 3 in said specification.

[*Official Gazette April 18, 1939.*]

DISCLAIMER 2,068,617.—*Edward Burke Wilford*, Merion, and *Elliot Daland*, Philadelphia, Pa. GYROPLANE. Patent dated January 19, 1937. Disclaimer filed March 23, 1939, by the patentees.

Hereby enter this disclaimer to claim 3 in said specification.

[*Official Gazette April 18, 1939.*]